United States Patent [19]
Dennis et al.

[11] 3,870,819
[45] Mar. 11, 1975

[54] CONFERENCE CALL APPARATUS FOR USE WITH KEY TELEPHONE SYSTEM EQUIPMENT

[76] Inventors: Roderick A. Dennis, 2855 S. Monaco Pky., Denver, Colo. 80222; Thomas J. Consiglio, 252 Penn, Denver, Colo. 80203; Gerald McGowan, 4175 S. Sidney Ct., Denver, Colo. 80237

[22] Filed: Dec. 26, 1973

[21] Appl. No.: 427,715

[52] U.S. Cl. .............................................. 179/1 CN
[51] Int. Cl. .............................................. H04m 3/56
[58] Field of Search .... 179/1 CN, 1 H, 1 HF, 1 AT, 179/1 VL, 18 BC; 325/406

[56] References Cited

UNITED STATES PATENTS

| | | | |
|---|---|---|---|
| 2,912,503 | 11/1959 | Grandstaff et al. | 179/1 CN |
| 2,975,237 | 3/1961 | Abbott | 179/1 CN |
| 3,610,827 | 10/1971 | Shaw | 179/1 CN |
| 3,814,856 | 6/1974 | Dugan | 179/1 AT |

*Primary Examiner*—William C. Cooper
*Assistant Examiner*—Douglas W. Olms
*Attorney, Agent, or Firm*—Clegg, Cantrell & Crisman

[57] ABSTRACT

Conference call telephone apparatus is coupled by a plurality of telephone lines to a conventional key telephone control circuit. The apparatus includes a mixing network having a mixing transformer and a compensating transformer and circuitry for selectively coupling each of the lines to the mixing transformer while at the same time coupling a corresponding impedance to the compensating transformer. The two transformers are also coupled to a line driver/receiver circuit which receives the signals transmitted over the telephone lines and applies the signals to a telephone receiver and also receives signals generated by a telephone transmitter and applies them via the mixing transformer to the telephone lines coupled to the transformer. The line driver/receiver provides isolation between the transmitter and receiver of the telephone and maintains a substantially constant current drive to each telephone line coupled to the mixing transformer regardless of the number of such lines. The line driver/receiver also provides substantially constant gain for received line signals and facilitates the proper matching of the telephone line impedances with corresponding impedances coupled to the compensating transformer.

31 Claims, 3 Drawing Figures

CONFERENCE CALL APPARATUS FOR USE WITH KEY TELEPHONE SYSTEM EQUIPMENT

BACKGROUND OF THE INVENTION

This invention relates to conference call telephone apparatus and more particularly to conference call telephone apparatus for use with standard key telephone system equipment.

Numerous arrangements have been suggested for placing so-called conference telephone calls in which three or more parties, each on a separate telephone line, may communicate. These arrangements oftentimes provide for the employment of microphones and loudspeakers at the different stations in place of the normal telephone handset so that the parties to the conference can carry on "hands free"communication.

A number of problems generally inhere in conference telephone networks, especially those which employ microphones and loudspeakers, including (1) singing caused by signal feedback between improperly isolated transmitters and receivers of the telephone station, (2) echo caused by improper input and (3) signal loss due to the connection of excessive numbers of telephone stations into the conference network. Rather elaborate and costly schemes have been devised to overcome these problems with such schemes oftentimes requiring complicated arrangements of amplifiers or repeaters, hybrid circuits, or voice control gain switching arrangements in which only one party to the conference is allowed to talk at any one time with the transmitter of the other parties being effectively disables while the one party is talking.

SUMMARY OF THE INVENTION

It is an object of the present invention to provide simple and inexpensive conference call apparatus.

It is another object of the present invention to provide conference call apparatus adapted for use with standard key telephone equipment.

It is still another object of the present invention to provide conference call apparatus which operates with conventional two-wire telephone systems.

It is a further object of the present invention to provide conference call apparatus which enables all parties to a conference call to speak and listen simultaneously.

It is still a further object of the present invention to provide conference call apparatus in which either microphones and loudspeakers or the standard telephone handsets may be used.

Finally, it is an object of the present invention to provide conference call apparatus which requires no modification of the existing telephone network.

These and other objects of the present invention are realized in a specific illustrative embodiment which includes a telephone set, a line driver/receiver, and a mixing network coupled to a key telephone control circuit by a plurality of telephone lines. The mixing network includes a mixing transformer, a compensating transformer, and circuitry for selectively coupling the telephone lines to the mixing transformer while simultaneously coupling corresponding compensation impedances to the compensating transformer. The circuitry also provides for selectively coupling the telephone lines to the telephone set. The mixing and compensating transformers are also coupled to the line driver/receiver which receives signals via the mixing transformer from the lines coupled thereto and applies the signals to the telephone set, and receives the signals generated by the telephone set and applies the signals to the mixing transformer and thus to the lines coupled thereto. Signals received over any line coupled to the mixing transformer induce corresponding signals on each of the other lines coupled to the transformer. The line driver/receiver provides isolation between the transmitter and receiver of the telephone set and, because of the compensating impedances presented to the line driver/receiver, maintain a substantially constant current drive and presents a substantially constant impedance to each telephone line coupled to the mixing transformer regardless of the number of such lines.

With the above embodiment, a conference connection may be established by successively coupling to the telephone set each line to be included in the connection, dialing a desired party on the line, and then placing the line in the "hole" condition. After all desired lines have been called, each of the lines is coupled to the mixing transformer and communication between the parties may commence.

BRIEF DESCRIPTION OF THE DRAWINGS

A complete understanding of the present invention and of the above and other objects and advantages thereof may be gained from a consideration of the following detailed description of a specific illustrative embodiment presented in connection with the accompanying drawings in which.

DETAILED DESCRIPTION

To better understand the operation of the conference call apparatus of the drawings, the operation of key telephone systems will be briefly explained. As is well-known, key telephone systems provide for the termination of a plurality of telephone lines in one telephone set and allow calls to be made to or from the set over any one of those lines. In addition, any line terminating in the set for which a talking path has been established can be placed on hold (the line is temporarily disconnected from the set) and another talking path established on a second line terminating in the set. The second line can, in turn, be placed on hold while still a third line is utilized, etc. Then, if "reconnection" is desired to one of the lines placed on hold, a button on the key telephone set corresponding to that line is depressed thereby reconnecting the line to the set. The conversation over that line can then be resumed.

In order to notify the user of a key telephone set of the status of the various lines terminating in the set, various auditory and visual signals are provided. For example, a flashing light signal on a line lamp indicates that an incoming call is being made on the corresponding line and once the incoming call has been answered, a steady light signal on the line lamp indicates that the particular line in question is in use. If the line is placed on hold, a so-called winking light signal (less intermittent than the flashing light signal) emanates from the lamp corresponding to the line which is on hold. Conventional key telephone systems consist generally of three main parts--(1) the key telephone set which includes the receiver and transmitter, dialing circuitry, and line lamps, (2) the key telephone system power supply for providing ringing or buzzer current, line lamp current, etc., and (3) the control circuit for controlling the functions and operations of the key telephone system including the above-described holding and visual signaling functions.

Figure 1:
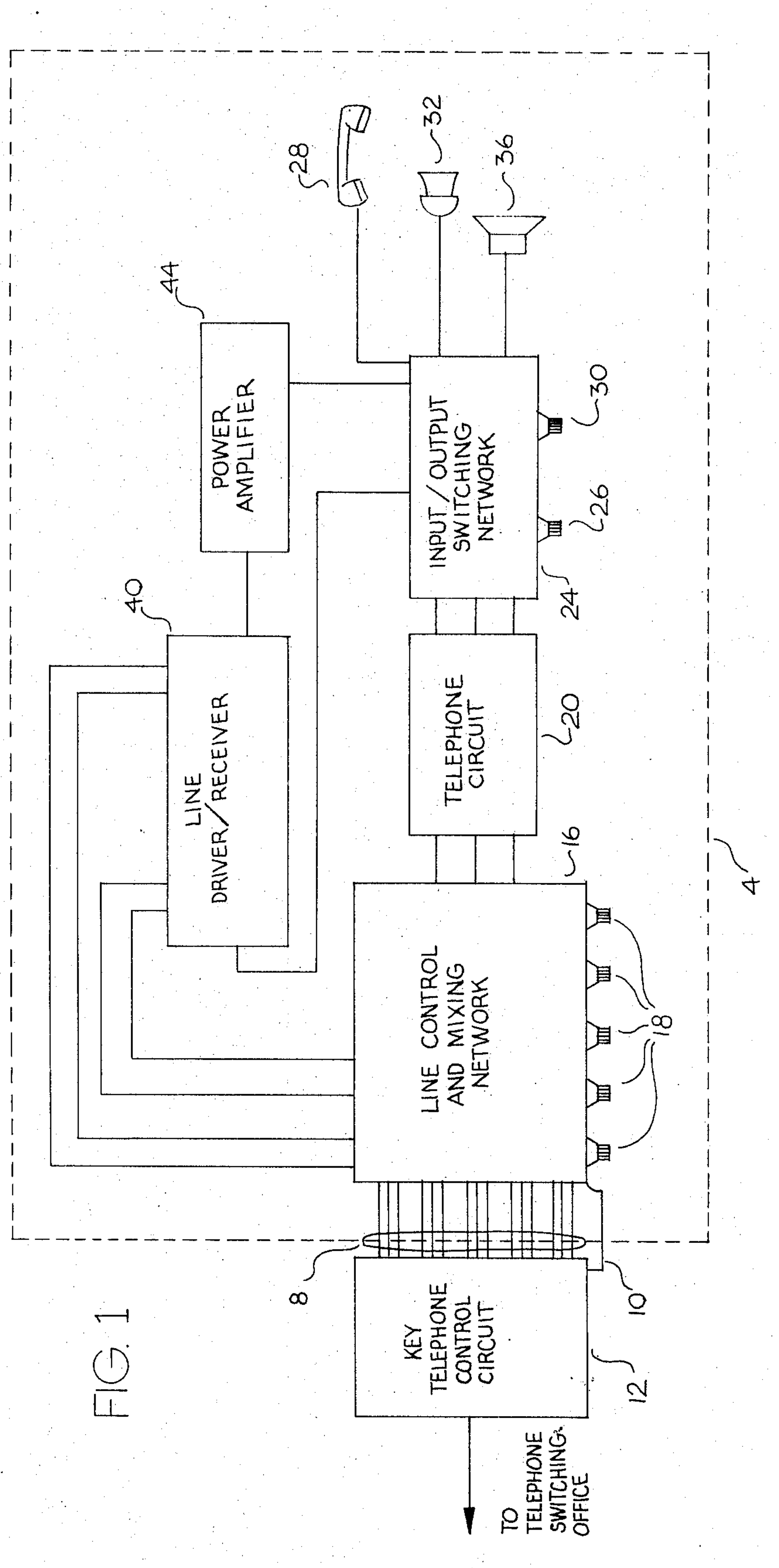
FIG. 1 is a block diagram showing of conference call apparatus made in accordance with the present invention.

The conference call apparatus shown in FIG. 1 is adapted for use with standard two-wire key telephone systems of the type described above. Specifically, conference call apparatus 4 is plug-for-plug innerchangeable with a conventional six-button key telephone set. The apparatus 4 is coupled by way of five telephone lines 8 to a conventional key telephone control circuit 12 which, in turn, is connected to a telephone network switching office. Each of the five telephone lines includes a tip and ring conductor and the so-called A battery conductor. A common return conductor 10 for the A battery conductors also couples the apparatus 4 to the key telephone control circuit 12.

The key telephone control circuit 12 may be any standard control circuit for two-wire key telephone systems capable of providing the usual holding functions.

The conference call apparatus 4 includes a line control and mixing network 16 coupled by the telephone lines 8 to the key telephone control circuit 12. The conference call apparatus 4 also includes a standard telephone circuit 20 coupled to the line control and mixing network 16 and to an input/output switching network 24. The input/output switching network 24 is, in turn, coupled to a line driver/receiver 40 and to a power amplifier 44. The line driver/receiver 40 is coupled to the power amplifier 44 and also to the line control and mixing network 16.

Although a telephone handset 28, a microphone 32 and a loudspeaker 36 are all shown coupled to the input/output switching network 24, it should be understood that these elements are actually part of the telephone circuit 20. When not in use, the telephone handset 28 rests on a switch hook which is part of the telephone circuit 20. The input-output switching network 24 simply provides for operating the conference call apparatus in either a standard telephone mode, in which case the telephone handset 28 is coupled to the telephone circuit 20 for use in the normal telephone manner, or in a telephone conference mode, in which either the telephone handset 28 or the microphone 32 and loudspeaker 36 can be selectively coupled to the line driver/receiver 40 and power amplifier 44 for use in a conference call. A control knob 26 is provided for enabling a system user to manually select either the telephone mode or the conference mode of operation. A control knob 30 is provided for enabling the user to select either the telephone handset 28 or the microphone 32 and loudspeaker 36 for use in a conference call.

The line control and mixing network 16 provides for controlling the status of each of the five telephone lines 8. The status of each line is controlled by a corresponding one of five control knobs 18. Each line may be placed in any one of five conditions by the corresponding control knob as follows: (1) a hold condition, (2) a "mix" condition in which the line is coupled to the line driver/receiver 40 for participation in a conference call, (3) a "telephone" condition in which the line is coupled directly to the telephone circuit 20 for use in placing or receiving normal telephone calls, (4) a "dial" condition in which the line is coupled to the telephone circuit 20 but bypassing the telephone switch hook to enable dialing over that line without removing the telephone handset 28 from the switch hook, and (5) an "off" condition in which the line is disconnected from any circuitry.

As previously indicated the telephone circuit 20 may be any standard telephone set operable with the telephone handset 28 and including the conventional dial or pushbutton mechanism. The power amplifier 44 is also conventional and provides impedance matching and amplification to drive the speaker 36 or receiver of the telephone handset 28.

The line driver/receiver 40 is provided to receive voice signals from the telephone lines via the line control and mixing network 16 and apply the signals via the amplifier 44 to either the loudspeaker 36 or the receiver of the telephone handset 28 depending upon whether the input/output switching network is set for handset or loudspeaker and receiver use. The line driver/receiver 40 also applies signals from either the microphone 32 or transmitter of the telephone handset 28 via the line control and mixing network to the telephone lines 8. Minimal coupling from the microphone 32 (or transmitter of the telephone handset 28) to the amplifier 44 is provided by the line driver/receiver 40 when signals are being generated by the microphone 32 (or transmitter of the telephone handset 28); minimal coupling is also provided from the speaker 36 (or receiver of the telephone handset 28) to the microphone 32 (or transmitter of the telephone handset 28) when signals are being received over one or more of the telephone lines 8. The line driver/receiver 40 provides drive current to the line control and mixing network 16 in proportion to the number of lines coupled to the line driver/receiver to, in effect, provide a constant gain regardless of the number of lines participating in a conference call. Finally, the line driver/receiver 40 presents an impedance to the line control and mixing network 16 proportional to the number of lines participating in a conference call to thereby provide impedance matching for the lines and maintain a substantially constant gain for received line signals. Establishment of a conference call will now be briefly described with reference to FIG. 1.

A conference call can be established either by dialing up the connections using the conference call apparatus 4 or by having the outside parties dial the different lines terminating in the conference call apparatus 4. Assuming that the connections were to be dialed up by the apparatus of FIG. 1, control knob 26 would be set to the "conference mode" position and control knob 30 set to enable use of either the handset 28 or the microphone 32 and loudspeaker 36 depending upon the desire of the user. One of the control knobs 18 corresponding to a particular line over which a first connection was to be made would then be set in either the telephone or dial position with the other control knobs being placed in the off condition. The dialing mechanism of the telephone circuit 20 would then be operated to establish a connection betwen the conference call apparatus and a called telephone station in the normal manner. Once this connection were established, the control knob corresponding to the connected line would be set to the hold position placing the corresponding line in the hold condition. Another one of the control knobs 18 would then be set in either the telephone or dial position to enable establishing a connection over the corresponding telephone line with another called telephone station. The control knob for the line would then be set in the hold position placing that line in the hold condition and the process repeated for other of the telephone lines. Up to five connections could be established since the conference call apparatus 4 is coupled to the key telephone control circuit 12 via five telephone lines.

After connections are established with the desired number of telephone lines, each of the control knobs 18 corresponding to these lines would be set in the mix position thereby coupling the lines to the line driver/receiver 40. Communication among the parties to the conference call could then commence and any number of parties to the call could speak and listen simultaneously with little degradation in transmission and reception of the voice signals.

If the conference call were to be established by outside parties dialing up the different lines coupled to the conference call apparatus 4, then each line would be successively rung, answered and placed on hold (using control knobs 18) until the desired number of lines were connected. The control knobs 18 corresponding to the connected lines would then be placed in the mix position, as before, and the conference call could proceed.

Figure 2A:
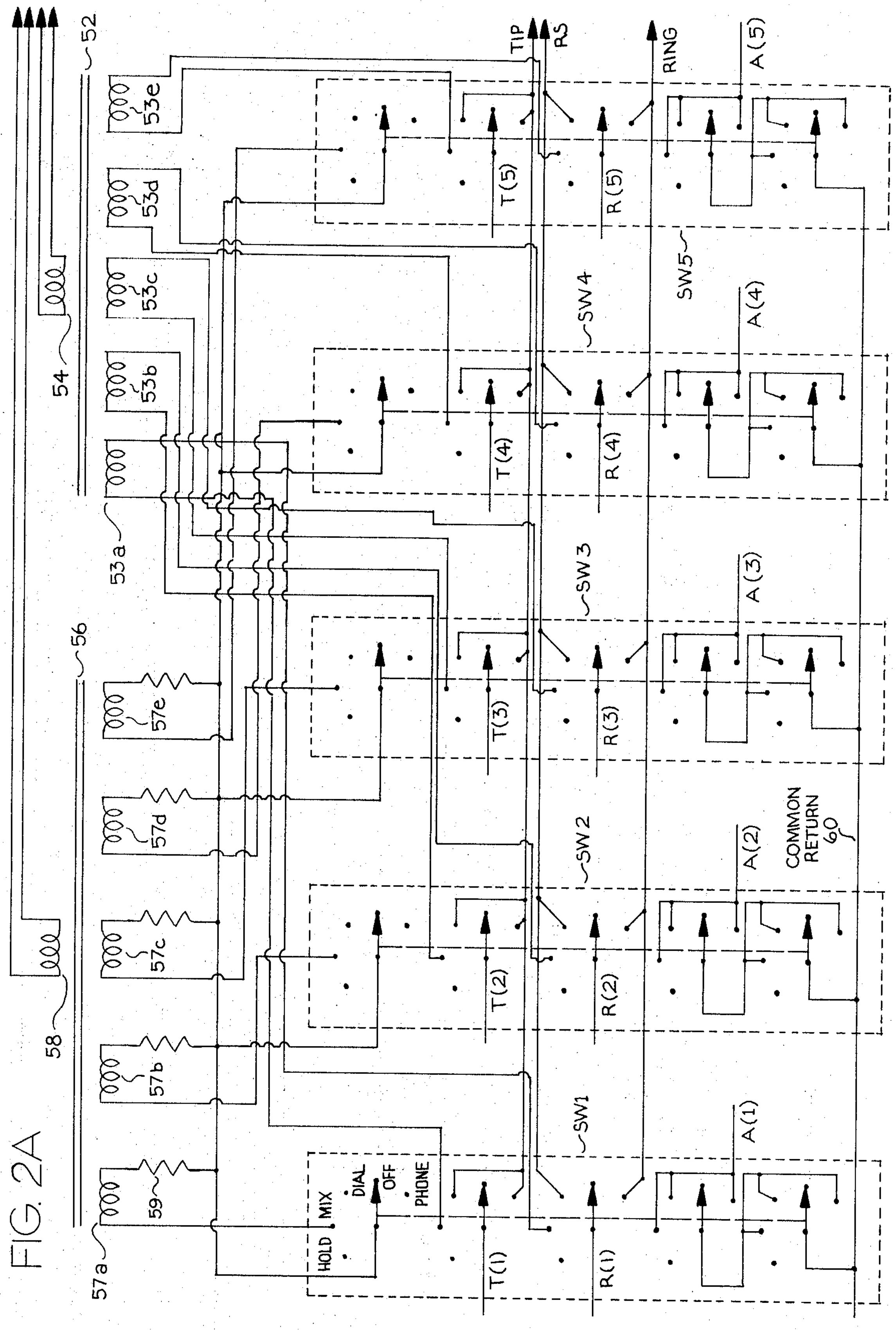
FIGS. 2A and 2B, with FIG. 2A positioned to the left of FIG. 2B, is a detailed circuit configuration of the appartus of FIG. 1.
Figure 2B:
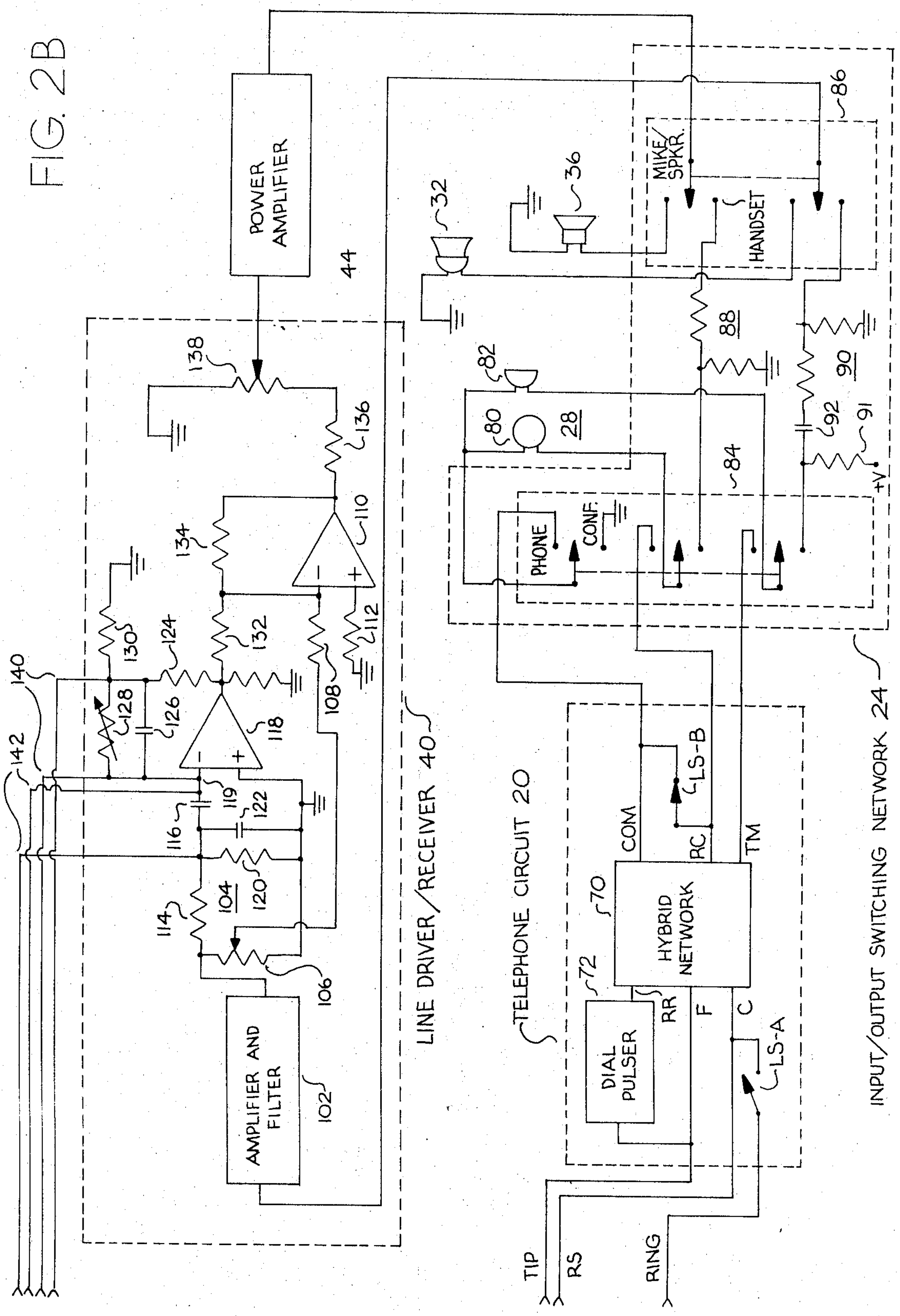

FIGS. 2A and 2B, with FIG. 2A placed to the left of FIG. 2B, show the detailed circuitry for the conference call apparatus 4 of FIG. 1. FIG. 2A shows the line control and mixing network 16 and FIG. 2B shows the remainder of the conference call apparatus. The line control and mixing network of FIG. 2A includes a mixing transformer 52 and a compensating transformer 56. One side of each of the transformers 52 and 56 is coupled to the line driver/receiver circuitry 40 of FIG. 2B. The other side of each transformer is coupled via five different windings to each of switches SW1, SW2, SW3, SW4 and SW5. Each of the switches is, in turn, connected to a different telephone line, each line comprising tip and ring conductors and an A battery conductor. Thus, switch SW1 is coupled to what will be referred to as line 1 comprising tip and ring conductors T(1) and R(1) and an A battery conductor A(1). Switch SW2 is connected to what will be referred to as line 2 comprising tip and ring conductors T(2) and R(2) and A battery conductor A(2), etc. Each of the lines 1 through 5 are coupled to the key telephone control circuit 12 of FIG. 1. Each of the switches SW1 through SW5 are also connected to the key telephone conrol circuit 12 via a common return conductor 60 which provides ground potential.

Each one of the switches SW (when referring to one of the switches SW1 through SW5, but no one in particular, the switch will simply be designated SW) includes five rotary switch mechanism each having a rotary wiper terminal and five stationary contacts each of which correspond to the previously described hold, mix, dial, off, and phone conditions. The wiper terminals of each switch SW are ganged together and also mechanically coupled to one of the control knobs 18 of FIG. 1. Rotation of one of the conrol knobs 18 would cause the group of five wiper terminals of the corresponding switch SW to rotate and successively contact each of the five corresponding stationary contacts. The switch setting indicia corresponding to the above-described five conditions are shown only for switch SW1 but it should be understood that these indicia apply in the same manner to the other four switches. The function of the line control and mixing network of FIG. 2A and the functions performed by the switches SW1 through SW5 when in the different settings will be discussed later after briefly describing the rest of the conference call apparatus.

Shown in FIG. 2B are more detailed circuit configurations of the telephone circuit 20, the input/output switching network 24 and the line driver/receiver 40. The telephone circuit 20 includes a hybrid network 70, a standard dial pulse mechanism 72 and line switches LS-A and LS-B. The dial pulse mechanism 72 could either be a rotary dial mechanism or a touch tone pad mechanism operable to transmit called number information via a tip conductor to the line control and mixing network of FIG. 2A. The two line switches LS-A and LS-B are shown in their normal positions when the telephone handset 28 is in the on hook condition. That is, when the telephone handset of the telephone ciruict 20 is on the switch hook, line switch LS-A is open and line switch LS-B is closed. The switch hook of the telephone circuit 20 (not shown) simply operates the switches LS-A and LS-B as described in response to the handset being removed from and placed on the switch hook. The hybrid network 70 is a conventional hybrid transformer circuit, such as, for example, the Bell Telephone System 425-B network, for isolating signals on conductors RC and TM. Such a network is necessary whenever both transmission and reception of voice signals take place over the same pair of wires (i.e. a two-wire telephone system). Specifically, signals applied to the hybrid network 70 via the conductors F and C are applied to the conductor RC for application to the receiver 80 of the telephone handset 28 (provided the input/output switching network 24 is properly set as will be discussed later.) Signals applied to the conductor TM from a transmitter 82 of the telephone handset 28 are applied by the hybrid network 70 to the conductors F and C for application to the line control and mixing network of FIG. 2A and thence over the telephone network. The conductor COM of the telephone circuit 20 is simply a common return for both conductors RC and TM.

The input/output switching network 24 includes a switch 84 for interconnecting the conference call apparatus so that it may be used in either the normal telephone mode or a conference call mode. The switch includes three wiper terminals ganged together, with each wiper terminal movable between two stationary contacts. When each wiper terminal is placed on its corresponding upper contact, the conference call apparatus may be used in the standard telephone mode whereas if each wiper terminal is placed on its corresponding lower contact, the conference call apparatus may be used in the conference call mode.

The input/output switching network 24 also includes a switch 86 having two wiper terminals each movable to contact either an upper stationary contact or a lower stationary contact. The upper stationary contacts are labeled "mike/speaker" and the lower stationary contacts are labeled "handset" for purposes which will become clear momentarily. The switch 86 is coupled to the loudspeaker 36 and to the microphone 32 and also to the power amplifier 44 and the line driver/receiver 40.

When the wiper terminals of the switch 84 are set in the phone condition (contacting the uppermost one of the corresponding pair of stationary contacts), then the COM conductor of the telephone circuit 20 is connected via the switch 84 to the return side of the receiver 80 and transmitter 82 of the telephone handset 28, the conductor RC of the telephone circuit 20 is connected via the switch 84 to the signal input side ("active" side) of the receiver 80, and the conductor TM of the circuit 20 is connected via the switch 84 to the signal output side (active side) of the transmitter 82 of the telephone handset 28. When the wiper terminals of the switch 84 are placed in the conference position so that the wiper terminals contact the lower stationary contact of the corresponding pair, the return sides of the receiver 80 and transmitter 82 of the telephone handset 28 are coupled to ground and the active sides of the receiver 80 and transmitter 82 are coupled via the switch 84 to the switch 86. If the wiper terminals of the switch 86 are placed in the handset position (in contact with the lowermost ones of the stationary contacts), then the receiver 80 of the telephone handset 28 is coupled to the power amplifier 44 and the transmitter 82 of the telephone handset is coupled to the line driver/receiver 40. In this latter position, the conference call apparatus is conditioned to operate in the conference mode with the telephone handset 28. When the wiper terminals of switch 86 are in the uppermost position (mike/speaker position), the speaker 36 is coupled to the power amplifier 44 and the microphone 32 is coupled to the line driver/receiver 40. Thus, in this position, the conference call apparatus is conditioned to operate in the conference mode with the use of the microphone 32 and speaker 36.

Voltage divider networks 88 and 90 are provided in the input/output switching network 24 to equalize the impedance of the telephone handset 28 to that of the microphone 32 and speaker 36. A voltage source 91 supplies operating power to the transmitter 82 of the telephone handset 28 and a capacitor 92 isolates the voltage source 91 from the line driver/receiver 40.

The line driver/receiver 40 includes a high gain amplifier and filter circuit 102 for amplifying signals received from either the transmitter 82 of the telephone handset 28 or from the microphone 32. Illustratively, the amplifier and filter 102 amplifies signals in the audio spectrum by a factor of 400. The amplifier and filter 102 also filters unwanted high-frequency components from the signals before application thereof to the remaining circuitry of the line driver/receiver 40.

The amplifier and filter 102 is connected to an input circuit of a differential input operational amplifier 118. The input circuit includes a voltage divider network 104, one leg of which is a potentiometer 106. The tap of the potentiometer is coupled via a resistor 108 to the inverting input of another differential input operational amplifier 110. The non-inverting input of the amplifier 110 is connected via a resistor 112 to ground potential. The other leg of the voltage divider network 104 includes a resistor 114 which is coupled via a capacitor 116 to the inverting input of another differential input operational amplifier 118. Coupled into the input circuit of the operational amplifier 118 across the capacitor 116 by conductors 142 is one side of the compensating transformer 56 of the line control and mixing network of FIG. 2A. A resistor 120 and capacitor 122 are connected in parallel and couple the junction between the resistor 114 and capacitor 116 to ground potential.

The operational amplifier 118 includes a feedback circuit comprising a resistor 124 coupled to the output of the amplifier 118, and a capacitor 126 and variable resistor 128 coupled in parallel and interconnecting the resistor 124 to the inverting input of the operational amplifier 118. One side of the mixing transformer 52 of the line control and mixing network of FIG. 2A is coupled into the feedback circuit of the operational amplifier 118 across the resistor 128 and capacitor 126 by conductors 140. A resistor 130 couples the junction of the resistor 124 and the parallel connection of the resistor 128 and capacitor 126 to ground potential. The output of the operational amplifier 118 is coupled via a resistor 132 to a feedback circuit of the operational amplifier 110 consisting of a resistor 134 coupled between the output of the operational amplifier 110 and the inverting input thereof. A resistor 136 couples the output of the operational amplifier 110 to a potentiometer 138 whose wiper terminal is coupled to the input of a power amplifier 44.

The line driver/receiver 40, in a manner to be described latter, operates to minimize the coupling or signal transfer from the output of the amplifier and filter 102 to the input of the powder amplifier 44 to prevent unwanted "squeal" caused by positive feedback from speaker to microphone and tending to maximize the coupling or signal transfer from the output of the amplifier and filter 102 to the conductors 140 and thus to the telephone lines coupled to the transformer 52 of FIG. 2A. The line driver/receiver 40 in conjunction with the line control and mixing networks of FIG. 2A also operates to increase the drive current to the conductor pair 140 in proportion to the number of telephone lines coupled to the mixing transformer 52 and to provide the proper impedance match for the telephone lines regardless of the number coupled to the mixing transformer 52. Finally, the line driver/receiver 40 receives signals over the conductor pair 140 from the mixing transformer 52 and applies the signals to the power amplifier 44.

The power amplifier 44 amplifies the signals received from the line driver/receiver 40 representing voice signals from the telephone lines coupled to the mixing transformer 52 and applies them to either the speaker 36 or the receiver 80 of the telephone handset 28 (depending upon the setting of switch 86) to thereby activate the speaker or receiver. The power amplifier 44 also provides impedance matching for both the receiver 80 and speaker 36. Any one of a number of power amplifiers as those typically employed in high fidelity and audio application, could be utilized for the power amplifier 44. Circuitry for performing the functions of the power amplifier 44 are well-known in the art and will not be described in further detail here.

The operation of the conference call apparatus will now be described in connection with FIGS. 2A and 2B. As can be seen from FIG. 2A, when a switch SW is set in the off position, the tip, ring and A battery conductors corresponding to that switch are simply disconnected from all circuitry of FIG. 2A. Of course, no signals can be received or transmitted over such disconnected telephone lines.

When one of the switches SW is positioned in the phone position, then the corresponding tip and ring conductors of that switch are coupled respectively to the tip and ring conductors interconnecting the line control and mixing network of FIG. 2A with the telephone cirucit 20 of FIG. 2B. Also, the A battery conductor of such switch is coupled to the common return conductor 60. Assume, for example, that switch SW1 were placed in the phone position so that the five wiper terminals of the switch were in contact with the lowermost one of the stationary contacts. In this position, the line 1 tip and ring conductors T(1) and R(1) would be coupled respectively to the tip and ring of conductors connected to the telephone circuit of FIG. 2B. The A battery conductor A(1) of line 1 would be coupled via the two lowermost switch mechanisms of switch SW1 to the common return conductor 60. In this condition, the telephone cirucit can be utilized to place and receive telephone calls over line 1 in the conventional manner provided the switch 84 of the input/output switching network 24 is placed in the phone position. (Interconnecting the A battery conductor A(1) to the common return conductor 60 places ground potential on the A(1) conductor to signal the key telephone control circuit 12 [FIG. 1] that line 1 is ready to dial pulse [when the telephone handset 28 is removed from its switch hook].)

When one of the switches SW is placed in the "dial" position, the telephone circuit 20 may be used to dial a number over the corresponding line of such switch without removing the telephone handset 28 from its switch hook. For example, if switch SW1 were placed in a dial condition, then the conductor T(1) would be coupled to the tip conductor leading to the telephone circuit 20, the conductor R(1) would be coupled to the RS conductor leading to the telephone circuit 20 and the A(1) conductor would again be coupled to the common return conductor 60. By coupling the conductor R(1) to the RS conductor, rather than to the ring conductor, line switch, LS-A is bypassed by the ring conductor of line 1 and thus connected directly to the hybrid network 70 for conducting dial pulses or touch tone signals as the case may be. Of course, when the R conductor of any line is coupled to the ring conductor leading to the telephone circuit 20 (rather than to the RS conductor), an open circuit exists between the ring conductor and the hybrid network 70 until the telephone handset 28 is removed from the switch hook closing the line switch LS-A. In this case, the ring conductor cannot be utilized to transmit dial pulses or touch tone signals until the telephone handset 28 is removed from the switch hook.

When a switch SW is placed in the "mix" position, the corresponding tip and ring conductors of that switch are connected across one of the windings of the transformer 52 thereby coupling the tip and ring conductors to the transformer. The corresponding A battery conductor of that switch is again coupled to the common return conductor 60. Further, a compensating impedance is coupled to the compensating transformer 56. Assume, for example, that switch SW1 is placed in the "mix" position. The conductors T(1) and R(1) would be coupled across the winding 53a of the transformer 52 to inductively couple the conductors T(1) and R(1) to the conductor pair 140 connected across the winding 54. The uppermost switch mechanism of switch SW1 would close a loop consisting of the wiper terminal of the uppermost switch mechanism, a resistor 59 and a winding 57*a*. In this manner, an impedance represented by the resistor 59 would be coupled to the compensating transformer 56. Each of the windings 57*a* through 57*e* are connected to a corresponding resistor which provides substantially a 600 ohm resistance to approximate the impedance of a standard telephone line. Thus, for every liner coupled to the mixng transformer 52 by operation of the switches SW, a corresponding impedance is coupled to the compensating transformer 56.

Placing a switch SW in the hold position places an open circuit between the corresponding tip and ring conductors of that switch and also places an open circuit between the corresponding A battery conductor and the common return conductor 60. When this occurs for any one of the olines following establishment of a call on that line, the key telephone control circuit 12 of FIG. 1 responds by placing that line in the hold condition. Specifically, the key telephone control circuit 12 responds to the removal of ground potential from the A battery conductor (i.e. the disconnection of the A battery conductor from the common return 60) by placing the corresponding line in a hold condition. When any one of the lines is placed in the hold condition, any of the other lines not in the hold condition or not in use may be used for receiving or placing a call.

As shown in FIG. 2A, every other winding 53 is phased opposite of the other windings, the purpose being to cause substantial cancellation of the DC flux generated by each of the windings.

As generally described earlier, a conference call connection may be established either by using the conference call apparatus of FIGS. 2A and 2B to establish connections over different ones of the lines terminating in the line control and mixing network or by outside parties establishing connections over the different lines to the conference call apparatus. In either case, when a connection is established over one of the lines with an outside party, the corresponding switch SW would be placed in the hold position to enable establishment of a connection over another one of the lines to another outside party. This process would continue until the desired number of parties (up to five) were connected, at which time the switches SW corresponding to the occupied lines would be placed in the mix position. For each line thus coupled to the mixing transformer 52, a corresponding matching impedance would be coupled to the compensating transformer 56. Communication could then commence using either the telephone handset 28 or the microphone 32 and speaker 36 (depending upon the setting of the switch 86) and assuming that the switch 84 were in the conference position.

Voice signals generated by either the transmitter 82 of the telephone handset or the microphone 32 would be applied to the amplifier and filter 102 and then to the conductor pair 140. These signals are impressed across the winding 54 of the mixing transformer 52 to induce similar voice signals in the windings 53 to which telephone lines are coupled. The voice signals are then transmitted over the telephone lines participating in the conference call and to the parties occupying those lines. The line driver/receiver 40 substantially prevents transfer of the signals from the amplifier and filter 102 to the power amplifier 44 to thereby provide desired isolation between the microphone 32 (or transmitter 82) and speaker 36 (or receiver 80).

Voice signals received over any line from a distant party are impressed across a corresponding one of the wings 53 of the mixing transformer 52 to thereby induce similar voice signals in each of the other windings 53 to which occupied lines are coupled. Voice signals received over a telephone line also induce similar voice signals in winding 54 and these signals are applied via conductors 140 and the line driver/receiver 40 to the power amplifier 44. The power amplifier 44 in turn amplifies these signals to drive either the speaker 36 or the receiver 80 of the telephone handset 28. With the arrangement of FIGS. 2A and 2B, any or all of the parties may speak and listen simultaneously without degradation of the voice signal transmissions. The operation of the line driver/receiver 40 will now be described.

Referring to FIG. 2B, signals from the amplifier and filter 102 are applied to the voltage dividing network 104 which, in turn, applies a portion of the current of the signals via the resistor 114 and the capacitor 116 and winding 58 (FIG. 2A) to the inverting input of the operational amplifier 118. The amount of current applied to the operational amplifier 118 is dependent upon the impedance presented by the compensating transformer 56, with the amount of current increasing proportionally as the number of compensating impedances coupled to the transformer 56 increases. In other words, the transformed impedance presented by the compensating transformer 56 decreases to enable more current flow as more compensating impedances are coupled to the transformer 56. Thus as more telephone lines are coupled to the mixing transformer 52 so that more compensating impedances are coupled to the transformer 56, the amount of current supplied to the inverting input of the operational amplifier 118 increases. As is well-known, the summation of currents at the summing junction of an operational amplifier must be zero for stable operation. Thus, as the current input from the compensating transformer 56 to the summing junction 119 of the operational amplifier 118 increases, the current output of the operational amplifier 118, which is of opposite polarity from the current input, is increased and applied via resistors 124 and variable resistor 128 and capacitor 126 to the inverting input. The current supplied to conductors 140 and thus to the mixing transformer 52 is thereby increased. From this it can be seen that as the number of telephone lines coupled to the mixing transformer 52 increases, the current output of the operational amplifier 118 increases proportionally so that the current drive into each telephone line participating in a conference call remains substantially constant (assuming a fixed signal level from the amplifier and filter 102). This is so regardless of the number of lines participating in a conference call.

As previously discussed, it is desirable to minimize the signal transfer from the amplifier and filter 102 to the power amplifier 44 in order to prevent squeal. This is accomplished by the circuitry of the line driver/receiver 40 as follows. The operational amplifier 118 provides a negative gain determined principally by the values of resistors 114, 120, 124 and 130, and the impedances presented by the compensating transformer 56 and the mixing transformer 52. Thus, for any current signal of amplitude I applied by the amplifier and filter 102 to the junction of the resistor 114 and potentiometer 106, a current signal of —GI will be produced at the output of the operational amplifier 118, where —G is the gain of the amplifier 118. The value of the resistors 132 and 108 and of the potentiometer 106 are selected so that the current applied by the operational amplifier 118 via the resistor 132 to the inverting input of the operational amplifier 110 is equal in amplitude (but opposite in polarity) to the current applied to this inverting input via resistor 108 and the tap of the potentiometer 106. The currents thus sum to zero and the output of the operational amplifier 110 is zero as desired. In this manner, none of the signal from the amplifier and filter 102 is passed to the power amplifier 44.

Specific illustrative values for the above-identified resistors and potentiometer for achieving zero gain from the amplifier and filter 102 to the power amplifier 44 are as follows:

| | | |
|---|---|---|
| Resistor 114 | = | 1,000 ohms |
| Resistor 120 | = | 1,000 ohms |
| Potentiometer 106 | = | 10,000 ohms |
| Resistor 124 | = | 1,000 ohms |
| Resistor 130 | = | 1,000 ohms |
| Variable Resistor 128 | = | 0 to 5,000 ohms |
| Resistor 132 | = | 20,000 ohms |
| Resistor 108 | = | 10,000 ohms |

Also remember that the impedance presented by the compensating transformer 56 is substantially the same as that presented by the mixing transformer 52. For the above values and configuration of the input and output circuits of the operational amplifier 118, the gain of the amplifier 118 is, using well-known procedures, calculable to be -1 (from the output of the amplifier and filter 102 to the output of the operational amplifier 118). Assuming that the relative current amplitude of the output of the amplifier and filter 102 is +1, then the relative current amplitude of the output of the operational amplifier 118 would be −1. It is clear that by adjustment of the potentiometer 106 (and the variable resistor 128), the amplitude of the positive current applied via the potentiometer 106 and resistor 108 to the inverting input of the operational amplifier 110 can be made very nearly equal to the amplitude of the negative current supplied via the resistor 132 to the inverting input. Thus, a resultant current of substantially zero amplitude is provided to the inverting input of the operational amplifier 110 as desired.

As discussed earlier, voice signals received from distant stations over one of the lines coupled to the mixing transformer 52 (FIG. 2A) induce corresponding signals in the winding 54 which are applied via the conductor pair 140 to the line driver/receiver 40. For example, assume that a voltage of 1 volt is induced at the summing point 119 as a result of a received voice signal. The operational amplifier 118 would operate to "neutralize" this voltage by generating an output voltage of —2 volts (provided that the impedance across the conductor pair 142 were substantially equal to the impedance across the conductor pair 140) which is reduced to −1 volts at the junction of the resistors 124 and 130 (assuming that the values of the resistors 124 and 130 are equal). Thus, the voltage at the summing point 119 is maintained at zero volts as required for stable operation.

The output of the operational amplifier 118, generated as a result of received signals, is applied via the resistor 132 to the inverting input of the operational amplifier 110 which responds by generating an output signal for application via the resistor 36 and potentiometer 138 to the power amplifier 44. The power amplifier 44, in turn, drives either the speaker 36 or the receiver 80 depending upon the setting of the switch 86.

If the impedance across the conductor pair 142 were not matched to that across the conductor pair 140, then the gain of the operational amplifier 118 would not be maintained substantially constant. Specifically, assuming that additional telephone lines were coupled to the mixing transformer 52 but that corresponding impedances were not also coupled to the compensating transformer 56, then the impedance appearing across the conductor pair 140 would decrease but the impedance appearing across the conductor pair 142 would not. The effect would be to decrease the gain of the operational amplifier 118 and thereby degrade any voice signals applied to the power amplifier 44 and thus to the speaker 36 or receiver 80. On the other hand, if compensating impedances are coupled to the compensating transformer 56 as telephone lines are coupled to the mixing transformer 52, then the impedance across the conductor pair 142 remains substantially equal to the impedance across the conductor pair 140 so that the operational amplifier 118 provides a substantially constant gain for received voice signals. (This, of course, assumes that the impedances of telephone lines are fairly constant and predictable to enable selection of an appropriate value for the compensating impedances.

Another way of viewing the effect of the compensating impedances is by considering the impedance presented across the conductor pair 140 to the mixing transformer 52. This impedance is adjusted each time an additional telephone line is coupled to the mixing transformer (by coupling a corresponding impedance to the compensating transformer 56) so that the impedance "seen" by each telephone line is maintained substantially constant. By maintaining a proper match of the telephone line impedances, maximum power transfer is achieved.

The capacitors 116, 122, and 126 of the line driver/receiver 40 are provided to filter out high frequency oscillations. Potentiometer 138 is provided to allow manual control of the amplitude of voice signals ultimately applied to the switching network 24.

Although a specific detailed embodiment of the present invention has been described, it is apparent that numerous alternative embodiments and modifications could be devised by those skilled in the art and that such alternative embodiments and modifications would fall within the scope of the invention. The appended claims are intended to cover all such apparent and obvious modifications.

What is claimed is:

1. Conference call apparatus for use in a key telephone system which includes a key telephone control circuit, the conference call apparatus including a mixing network, a plurality of telephone lines coupling the mixing network to the key telephone circuit, a telephone set coupled to the mixing network and including a transmitter and receiver and dialing apparatus, and line driver and receiver circuity coupled to the mixing network and to the telephone set, said mixing network including first and second transformers, each coupled to the line driver and receiver circuitry, a plurality of impedance means, and switch means for selectively coupling each of said telephone lines to said first transformer and for selectively coupling each of said impedance means to said second transformer so that the impedance presented by said second transformer to the line driver and receiver circuitry is substantially the same as the impedance presented by said first transformer to the line driver and receiver circuitry, and said line driver and receiver circuitry including means for applying to the receiver of said telephone set signals induced on said first transformer by voice signals transmitted over the telephone lines coupled to the first transformer, and means for applying to said first transformer signals from the transmitter of said telephone set to thereby induce corresponding signals on each of the telephone lines coupled to said first transformer.

2. Apparatus as in claim 1 wherein said switch means includes means for selectively coupling each of said telephone lines to said telephone set.

3. Apparatus as in claim 2 wherein said telephone lines each include tip and ring conductors and an A-battery conductor, wherein said first transformer includes a first winding coupled to the line driver and receiver circuitry and a plurality of additional windings, each of which corresponds to a different one of said telephone lines, wherein said second transformer includes a first winding coupled to the line driver and receiver circuitry and a plurality of additional windings, each of which corresponds to a different one of said impedance means, and wherein said switch means includes a plurality of switch mechanisms each corresponding to a different one of said telephone lines and a different one of said impedance means for selectively coupling the tip and ring conductors of the corresponding telephone line across the corresponding one of said additonal windings of said first transformer, for simultaneously coupling the A-battery conductor of the corresponding telephone line to ground potential, and for simultaneously coupling the corresponding impedance means to the corresponding one of said additional windings of said second transformer.

4. Apparatus as in claim 3 wherein each of said switch mechanisms further includes means for decoupling the corresponding tip and ring conductors from the corresponding winding of the first transformer, for simultaneously decoupling the corresponding A-battery conductor from ground potential, and for simultaneously decoupling the corresponding impedance means from the corresponding winding of the second transformer.

5. Apparatus as in claim 3 wherein said line driver and receiver circuitry includes a first differential input operational amplifier having an inverting input terminal, a non-inverting input terminal, and an output terminal, means coupling one end of the first winding of said first transformer to said inverting input terminal and the other end thereof to the output terminal, means coupling the first winding of said second transformer to said inverting input terminal, a second differential input operational amplifier including an inverting input terminal, a non-inverting input terminal and an output terminal, first resistance means coupling the output terminal of said first operational amplifier to the inverting input terminal of said second operational amplifier, second resistance means coupling the transmitter of said telephone set to the inverting input terminal of said first operational amplifier, third resistance means coupling the transmitter of said telephone set to the inverting input terminal of said second operational amplifier, and means coupling the output terminal of said second operational amplifier to the receiver of said telephone set.

6. Apparatus as in claim 5 wherein said line driver and receiver circuitry further includes first capacitance means coupled in parallel with the first winding of said first transformer and second capacitance means coupled in parallel with the first winding of said second transformer.

7. Apparatus as in claim 6 further including fourth and fifth resistors having substantially the same resistance value, and connected in series between the output terminal of said first operational amplifier and ground potential, the junction of said fourth and fifth resistors being coupled to said other end of the first winding of said first transformer, and wherein said second resistance means includes sixth and seventh resistors having substantially the same resistance value as said fourth and fifth resistors, said sixth resistor coupling the transmitter of said telephone set to said second capacitance means, and said seventh resistor coupling the junction between said sixth resistor and said second capacitance means to ground potential.

8. Apparatus as in claim 7 wherein said third resistance means includes an eighth resistor and a potentiometer, one side of said potentiometer being coupled to the transmitter of said telephone set, the other side thereof being coupled to ground potential, and the tap thereof being coupled in series with said eighth resistor to the inverting input terminal of said second operational amplifier.

9. Apparatus as in claim 5 further including amplifier and filter circuitry interconnecting said second resistance means and said third resistance means with the transmitter of said telephone set.

10. Apparatus as in claim 9 wherein said means coupling the output terminal of said second operational amplifier to the receiver of said telephone set comprises amplifier circuitry.

11. Apparatus as in claim 2 further including a speaker circuit, a microphone circuit, and second switch means having first and second positions for coupling said sneaker circuit and microphone circuit to said line driver and receiver circuitry when in the first position.

12. Apparatus as in claim 11 further including third switch means having first and second positions for coupling the receiver and transmitter of said telephone set to said second switch means while decoupling said receiver and transmitter from the telephone set when in the first position, and for decoupling the receiver and transmitter of the telephone set from said second switch means while coupling the receiver and transmitter to the telephone set when in the second position, and said second switch means coupling said third switch means to the line driver and receiver circuitry when said second switch means is in the second position.

13. Conference call apparatus for use with a key telephone control circuit to which the apparatus coupled by a plurality of telephone lines, said conference call apparatus comprising telephone apparatus including transmitter means and receiver means, a mixing network connected to said plurality of telephone lines, said mixing network including a mixing transformer, a compensating transformer, a plurality of impedance means each corresponding to a different one of said telephone lines, means for selectively coupling each of said telephone lines to said mixing transformer and the corresponding impedance means to said compensating transformer or for alternatively coupling each of said telephone lines to said telephone apparatus, a first differential input operational amplifier including an inverting input terminal, an output terminal, an input circuit coupled to the input terminal, and a feedback circuit coupling the output terminal to the input terminal, a second differential input operational amplifier including an inverting input terminal and an output terminal, first means coupling the mixing transformer to the feedback circuit of said first operational amplifier for conducting signals therebetween, second means coupling the compensating transformer to the input circuit of said first operational amplifier to present an impedance thereto which is substantially equal to the impedance presented to the feedback circuit of said first operational amplifier by the mixing transformer, third means coupling the output terminal of said first operational amplifier to the inverting input terminal of said second operational amplifier, fourth means coupling the input circuit of said first operational amplifier to the inverting input terminal of said second operational amplifier, fifth means coupling the output terminal of said second operational amplifier to the receiver means of said telephone apparatus, and sixth means coupling the input circuit of said first operational to the transmitter means of said telephone apparatus.

14. Apparatus as in claim 13 wherein each of said telephone lines includes a tip conductor, a ring conductor and an A-battery conductor, wherein said mixing transformer includes a plurality of windings inductively coupled together and an additional winding inductively coupled to said plurality of windings, wherein said compensating transformer includes a plurality of windings inductively coupled together and an additional winding inductively coupled to the plurality of windings of said compensating transformer, wherein the coupling means of said mixing network includes a plurality of switch apparatus each having first and second positions, each switch apparatus, when in the first position, coupling the tip and conductors cnductors of a different one of said telephone lines across a different one of the plurality of windings of said mixing transformer, coupling the corresponding A-battery conductor of said different one of said telephone lines to ground potential, and coupling a different one of said impedance means across a different one of the plurality of windings of said compensating transformer, and each switch apparatus, when in the second positions, coupling the tip and ring conductors of said different one of said telephone lines to said telephone apparatus and coupling the corresponding A-battery conductor to ground potential, wherein said first coupling includes a first pair of conductor coupling the additional winding of said mixing transformer to the feedback circuit of said first operational amplifier, and wherein said second coupling means includes a second pair of conductors coupling the additional winding of said compensating transformer to the input circuit of said first operational amplifier.

15. Apparatus as in claim 14 wherein each switch apparatus of said mixing network has a third position in which the tip and ring conductors of said different one of said telephone lines is decoupled from said different one of the plurality of windings of said mixing transformer and from said telephone apparatus to place an open circuit condition between the tip and ring conductors and in which corresponding A-battery conductor of said different one of said telephone line is decoupled from ground potential.

16. Apparatus as in claim 14 wherein the input circuit of said first operational amplifier includes capacitance means, one side of which is coupled to the inverting input terminal of said first operational amplifier and to a first one of the conductors of said second pair of conductors, the other side of said capacitance means being coupled to a second one of the conductors of said second pair of conductors, first resistance means coupling said other side of said capacitance means to said sixth coupling means, second reistance means coupling the junction of said capacitance means and said first resistance means to ground potential, and a potentiometer, one side of which is coupled to said first resistance means to form a voltage divider circuit, the other side of which is coupled to ground potential, and the tap of which is coupled via said fourth coupling means to the inverting input terminal of said second operational amplifier.

17. Apparatus as in claim 16 wherein the feedback circuit of said first operational amplifier includes third resistance means interconnecting the output terminal of said first operational amplifier to a first one of the conductors of said first pair of conductors, second capacitance means, one side of which is coupled to the junction of said second resistance means and the first conductor of said first pair of conductors and the other side of which is coupled to the inverting input terminal of said first operational amplifier, and fourth resistance means coupling the junction of said third resistance means and the first conductor of said first pair of conductors to ground potential.

18. Apparatus as in claim 17 wherein the feedback circuit of said first operational amplifier further includes variable resistance means connected in parallel with said second capacitance means.

19. Apparatus as in claim 18 wherein said fourth coupling means includes fifth resistance means, wherein said third coupling means includes sixth resistance means, and said conference call apparatus further including seventh resistance means coupling the output terminal of said second operational amplifier to the inverting input terminal thereof.

20. Apparatus as in claim 19 wherein said sixth coupling means includes a high gain amplifier and filter circuit.

21. Apparatus as in claim 20 wherein said fifth coupling means includes a power amplifier circuit.

22. Apparatus as in claim 13 further including microphone means, speaker means, and a switching network comprising means for selectively coupling the transmitter means and receiver means of said telephone apparatus either to said sixth coupling means and said fifth coupling means respectively or to said telephone apparatus, and means for coupling the microphone means to said sixth coupling means when the transmitter means of said telephone apparatus is decoupled therefrom and for coupling the speaker means to said fifth coupling means when the receiver means of said telephone apparatus is decoupled therefrom.

23. Conference call apparatus coupled by a plurality of telephone lines to a key telephone control circuit, said apparatus comprising a telephone set having a transmitter and receiver, a first differential input operational amplifier including first and second input terminals, an output terminal, an input circuit coupled to said first input terminal, and a feedback circuit coupling said output terminal to said first input terminal, a second differential input operational amplifier including first and second input terminals and an output terminal, first means coupling the output terminal of said first operational amplifier to the first input terminal of said second operational amplifier, second means coupling the input circuit of said first operational amplifier to the first input terminal of said second operational amplifier, third means for applying signals from the output terminal of said second operational amplifier to the receiver of said telephone set, fourth means for applying signals from the transmitter of said telephone set to the input circuit of said first operational amplifier, and a mixing network including means for selectively coupling said telephone set to each of said telephone lines to enable establishment of connections thereover to other telephone stations, means operative with said key telephone control circuit for placing in the hold condition said telephone lines over which connections have been established, means for selectively coupling said telephone lines to the feedback circuit of said first operational amplifier, and means for presenting to the input cirucit of said first operational amplifier an impedance which is inversely proportional to the number of telephone lines coupled to the feedback circuit of said first operational amplifier.

24. Apparatus as in claim 23 wherein said means for selectively coupling said telephone lines to the feedback circuit of said first operational amplifier includes a first transformer having a plurality of windings inductively coupled together and each of which may be selectively coupled to a different one of said telephone lines and having an additional winding inductively coupled to said plurality of windings and connected to the feedback circuit of said first operational amplifier, and wherein said presenting means includes a plurality of impedance means and a second transformer having a plurality of windings inductively coupled together and each of which may be selectively coupled to a different one of said impedance means and having an additional winding inductively coupled to the plurality of windings of said second transformer and connected to the input circuit of said first operational amplifier.

25. Apparatus as in claim 24 wherein the feedback circuit of said first operational amplifier includes first and second resistance means coupled in series between the output terminal of said first operational amplifier and ground potential, first capacitance means, one side of which is coupled to the junction between said first and second resistance means and the other side of which is coupled to the first input terminal of said first operational amplifier, said first capacitance means being coupled in parallel with the additional winding of said first transformer, and wherein the input circuit of said first operational amplifier includes second capacitance means, one side of which is coupled to the first input terminal of said first operational amplifier, third resistance means interconnecting the other side of said second capacitance means with said fourth applying means, and fourth resistance means coupling the junction between said second capacitance means and said third resistance means to ground potential, said second capacitance means being coupled in parallel with the additional winding of said second transformer.

26. Apparatus as in claim 25 wherein the input circuit of said first operational amplifier further includes a potentiometer, one end of which is coupled to the junction between said third resistance means and said fourth applying means, the other end of which is coupled to ground potential, and the tap of which is coupled to said second coupling means.

27. Apparatus as in claim 26 wherein the feedback circuit of said first operational amplifier further includes variable resistance means coupled in parallel with said first capacitance means.

28. Apparatus as in claim 27 wherein the resistance values of said first, second, third and fourth resistance means are substantially the same and wherein the capacitance values of said first and second capacitance means are substantially the same.

29. Apparatus as in claim 28 wherein said first coupling means is a resistor and wherein said second coupling means is a resistor.

30. Apparatus as in claim 29 wherein said third applying means comprises power amplifier circuitry.

31. Apparatus as in claim 30 wherein said fourth applying means comprises amplifier and filter circuitry.

* * * * *